United States Patent Office 3,411,992
Patented Nov. 19, 1968

3,411,992
DISTILLATION UTILIZING A VAPOR COMPRESSOR AND AN IMMISCIBLE LIQUID-SOLID MEDIUM
Ewart E. L. Mitchell, Princeton, N.J., assignor to Electronic Associates, Inc., Long Branch, N.J., a corporation of New Jersey
Continuation of application Ser. No. 289,852, June 24, 1963. This application Dec. 11, 1967, Ser. No. 689,728
7 Claims. (Cl. 203—11)

ABSTRACT OF THE DISCLOSURE

A molten liquid heat exchange medium immiscible in saline water mixed therewith and sprayed or distributed on a tray in an evaporator wherein the aqueous portion of the feed vaporizes and the immiscible medium is partially solidified. The vapor withdrawn by a compressor is then brought into direct contact with the solidified medium to condense the vapor and remelt the medium for recycle to the evaporator.

---

This application is a continuation of application Ser. No. 289,852 filed June 24, 1963, now abandoned.

This invention relates to a process and an apparatus for water purification and, more particularly, for the production of fresh water from a water solution such as saline water.

The problem of producing fresh water from saline water, such as sea water, by means of a cheap and reliable process has long been sought. There has been proposed electrodialysis of sea water which involves the use of a semipermeable membrane and electrodes which provide for the movement of the saline water through the membrane. In addition, freezing processes have been tried in which the crystals of ice that are obtained consist of pure water. Both of these processes leave something to be desired in simplicity of operation, in low fuel requirements, and in the production of a pure water end product.

Distillation has also been widely used and, while the water produced in this process is relatively pure, the fuel and equipment requirements of such distillation has been a serious drawback. It has been found that the fuel requirements in such distillation processes are of a high order of magnitude since the salt water is heated in a metallic vessel, and there is inefficient heat transfer of the heat for distillation through the metallic barrier of the vessel to the saline water.

Accordingly, an object of the present invention is the distillation of sea water in which heat for distillation is efficiently transferred to the saline water.

Another object of the present invention is a distillation process having low energy requirements and not requiring metallic heat exchange surfaces.

In accordance with the present invention saline water, or any other crude solution of solvent and solute is mixed with an immiscible heat transfer liquid at its melting point temperature which supplies the heat for distillation. The mixture is fed to an evaporator in which the solvent is vaporized to produce pure solvent vapor and, at the same time, the immiscible liquid partially solidifies to form a slurry while isothermal conditions are maintained at close to the melting point. The slurry and the portion of the solution which has not vaporized and which has become concentrated, are removed from the evaporator and separated with the slurry then being passed to a condenser. The pure solvent vapor is compressed and fed into the condenser at a higher pressure than that in the evaporator so that vapor condenses on the slurry and melts it to its liquid immiscible state. The immiscible liquid and condensed pure solvent are removed from the condenser, separated one from the other, and that separated immiscible liquid is then recirculated to the initial stage for addition to new batches of fresh solution.

In this manner, as a result of mixing the immiscible liquid and the solution and vaporizing the water, and as a result of condensing the vapor on the slurry, heat flow between the liquid phase and the vapor phase is through much smaller temperature gradients than in conventional metallic heat transfer surfaces. Accordingly, with those smaller temperature gradients, the energy requirements are greatly reduced from those of convenitonal distillation processes. In addition, since such heat flow is not through metallic barriers any scale which does develop has no affect on the heat flow.

In a preferred form of the invention crude saline water is used as the solution and is initially heated, by means of heat exchangers, to a temperature slightly less than the melting point temperature of the immiscible heat transfer liquid. The heat may be supplied to the heat exchangers from the concentrated solution (saline water) removed from the evaporator and such heat may also be supplied from the condensed pure solvent (pure water). In addition, the concentrated saline water and the slurry which are removed from the evaporator may be separated in a separating tank by means of gravity, in which one of them will float while the other will sink. Such gravity separation may also be accomplished with the pure water and immiscible liquid removed from the condenser.

For a more detailed disclosure of the invention, and for further objects and advantages thereof, reference is to be had to the following description taken in conjunction with the accompanying drawings.

Figure 1:
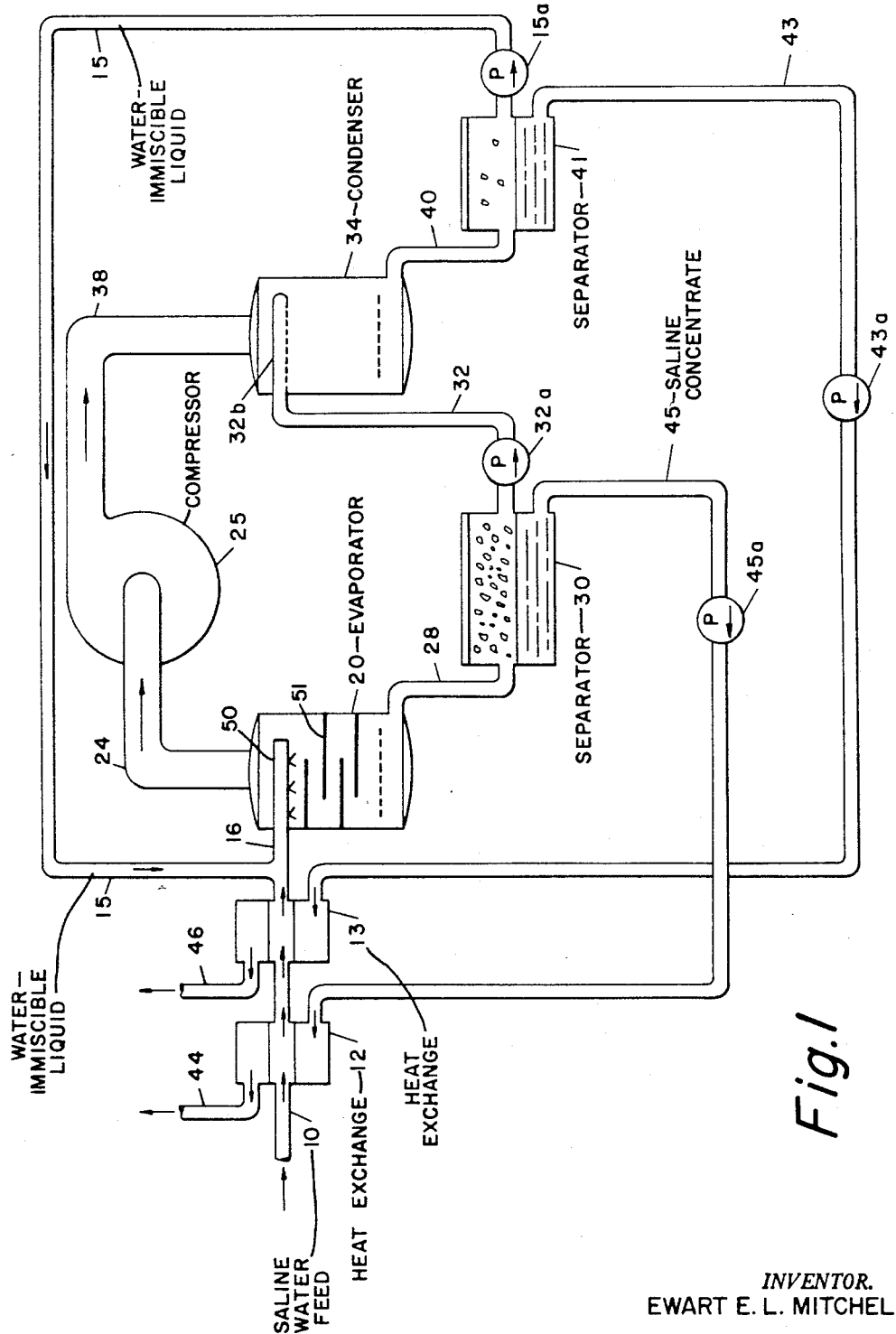
FIG. 1 illustrates a schematic view of apparatus embodying the invention.

Referring to FIGURE 1, crude saline water in the form of sea water from a feed line 10 flows in the direction indicated and through a heat exchanger 12 and then through a heat exchanger 13. As a result, the temperature of the crude saline water discharged from the heat exchanger 13 has been increased until its temperature is somewhat less than the melting point temperature of an immiscible heat transfer liquid flowing in a supply line 15. For example, that discharged saline water may have a temperature 2° C. to 3° C. less than the temperature of the immiscible liquid. The discharged saline water flows through a mixing line 16 which connects in a T section with the line 15 to provide for the mixing of the immiscible liquid and of the saline water. As a result of this mixing, the temperature of the crude saline water is raised to substantially the melting point temperature $T_m$ of the immiscible liquid which point is illustrated on the vapor pressure curves of FIG. 2.

In a preferred form of the invention, the immiscible heat transfer liquid is selected from materials which may have the properties of rapid separation from water, insolubility in water and having no effect or chemical action with water. In addition, it will be understood by those skilled in the art that in differing applications the material may also have one or more of the following properties:

(1) high latent heat of melting
(2) relatively cheap
(3) low viscosity, and
(4) no odor or taste.

Organic materials have many of the above properties and an organic compound having particular desired properties may be selected from standard texts such as The Handbook of Chemistry and Physics, 42nd edition, Chemical Rubber Publishing Co., 1960–1961, at p. 1352 et seq.

Figure 2:
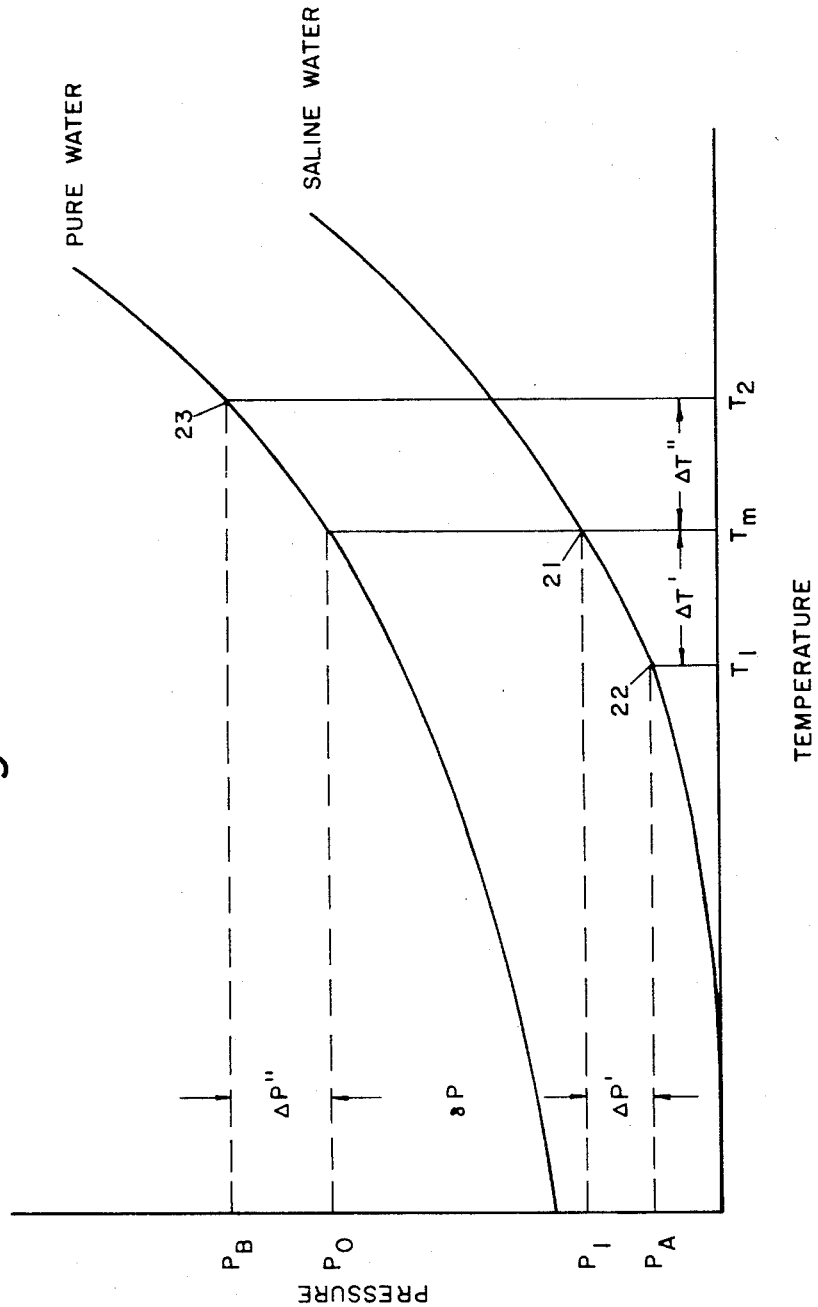
FIG. 2 illustrates vapor pressure curves of saline water and of pure water.

In the embodiment of FIG. 2 wax has been utilized. Thus, the immiscible heat transfer liquid flowing in line 15 and being mixed with the crude saline water is a liquid wax containing some solid wax and both are at the melting point temperature of wax.

The mixture of immiscible liquid wax and the heated crude saline water enters an evaporator 20 through an inlet at the upper end thereof. A line 24 extends from the top of evaporator 20 to the inlet of a compressor which is effective to reduce the pressure in the evaporator to a desired value. The saline water may be vaporized in the evaporator 20 by any one of the well-known means such as spraying the mixture into the evaporator as at 50 or by utilizing a tray means 51. On the vaporization curve of saline water as illustrated in FIG. 2, point 21 designates the vaporization point of the saline water at the melting point temperature of the wax and at a pressure $P_1$. Thus, the heat of vaporization of the saline water is supplied by the liquid wax and heat flows from the liquid wax to the saline water and then from that water to its vapor which is in the form of pure water vapor. As a result of that heat transfer between the liquid phase to the vapor phase, the temperature of the liquid saline water decreases slightly by an amount $\Delta T'$ so that the temperature of the saline water is for practical purposes equal to $T_m - \Delta T'$ which is represented by $T_1$ in FIG. 2. Accordingly, with the temperature of the saline water being $T_1$, point 22 designates the new vaporization point on the saline water curve and a reduced pressure $P_A$ is required to provide for the vaporization of the saline water. It is in this manner, that isothermal conditions are maintained close to the melting point $T_m$ of the wax by a factor of $\Delta T'$ which, for example, may be 0.5° F. to 1° F. In accordance with the invention, as a result of that small temperature difference or gradient $\Delta T'$ between the heat transfer liquid and the saline water there is achieved efficient heat transfer between the liquid phase and the vapor phase as compared with conventional metallic heat transfer surfaces. As will later be described in detail, that efficient heat transfer provides greatly reduced energy requirements as compared with such conventional systems.

The portion of the saline water which does not vaporize settles to the lower part of the evaporator 20 in the form of a concentrated saline solution. In addition, the liquid wax which has supplied the heat of vaporization to the saline water also settles to the lower part of the evaporator 20. As a result of supplying that heat of vaporization a portion of the liquid wax solidifies to form a slurry of liquid wax and solid wax. For example, the slurry may consist of fifty percent solid wax and fifty percent liquid wax with the slurry remaining at the melting point temperature of wax.

It will now be clear that deposits from the saline water will normally remain suspended in the concentrated saline solution. Any scale, however, that does develop does not interfere with the heat transfer. This is to be compared with conventional distillation systems in which scale does develop on the metallic heat transfer surfaces and does appreciably impede the heat transfer.

The concentrated saline solution including all such deposits and the slurry are discharged from the bottom of the evaporator through a line 28 to a separating tank or vessel 30. In this tank the concentrated saline solution and the slurry gravity separate for the reason that the concentrated saline solution has a substantially higher specific weight than the slurry. The solution settles to the bottom of the tank 30 while the slurry rises to the top of the tank. Accordingly, there is provided in the right hand end of the tank at its upper part a line 32 having a pump 32a inserted therein for discharging the slurry from the tank and for conducting the slurry to an inlet at the upper end of a condenser 34. The slurry is then led through a distributing conduit 32b for discharging the slurry equally throughout the condensing chamber.

It will be remembered that the compressor 25 reduces the pressure in the evaporator 20. In addition, the compressor 25 creates a suction on the line 24 and withdraws the pure water vapor from the evaporator by way of the line 24 and then compresses that vapor. That compressed vapor is discharged from the compressor into a line 38 through which it is conducted to an inlet in the top of the condenser 34. In this manner, the compressed water vapor is conducted to the slurry and condenses on the slurry which receives the heat of condensation. Referring now to the vapor pressure curve of pure water in FIG. 2, it will be seen that if the pure water vapor condensed at the melting point temperature of the slurry in the condenser then it would be necessary that the pressure in the condenser be $P_0$. However, it will be understood by those skilled in the art that as a result of the heat transfer from the vapor phase to the liquid phase, the temperature of the pure water as it condenses will be somewhat above $T_m$ by an amount $\Delta T''$. Accordingly, the temperature of the condensed pure water, for practical purposes, is equal to $T_m + \Delta T''$ which is represented by $T_2$ in FIG. 2 and thus isothermal conditions are maintained at close to the melting point of wax. With the temperature of the pure water equal to $T_2$, the vaporization point for that temperature is designated by the point 23 on the pure water vaporization curve. For that vaporization point, the compressor must provide a pressure $P_B$ to produce the condensation of the pure water vapor. Thus in the above-described condensation, as a result of the small temperature difference or gradient $\Delta T''$ between the temperature of the slurry and the temperature of the condensed water vapor, there is achieved efficient heat transfer from the vapor phase to the liquid phase.

With the foregoing efficient heat transfer from the vapor phase to the liquid phase in the condenser and the efficient heat transfer from the liquid phase to the vapor phase in the evaporator there is provided greatly reduced energy requirements as compared with conventional systems for the following reasons which may be expressed mathematically. It is well known that the equation for the least thermodynamic work required for separation of a solvent from a solution may be expressed as (1) $$W = RT_m \frac{\delta n}{N} \text{ B.t.u./mole}$$

where:
$W$ = work
$R$ = gas constant per mole
$\delta n / N$ = moles solute in $N$ moles solution For the purpose of explanation, it will be assumed in the system of FIG. 2 that a 6% NaCl solution has been completely dissociated to provide 3.6 mole percent. Thus, in the assumed condition the reversible or theoretical value of work required to produce distillation is (2) $\quad\quad\quad W = 36$ B.t.u./mole
(3) $\quad\quad\quad W = 2$ B.t.u./lb. at 500° R.

With isothermal conditions maintained close to the melting point temperature of the wax, the total temperature change may be expressed as $\Delta T$ and is equal to $\Delta T' + T''$. In this practical case, in order to solve for the actual thermodynamic work required the following expressions may be used.

The Clausius-Clapeyron equation may be expressed as (4) $$\frac{\delta P}{\delta T} = \frac{L_v}{RT^2} P$$

with $\Delta P'$ as illustrated in FIG. 2, being the pressure difference between $P_1$ and $P_A$, Equation 4 may be simplified for vaporization to the approximate expression (5) $$\frac{\Delta P'}{P} = \frac{L_V}{RT_m^2}\Delta T'$$

where:

$L_v$ = the molal latent heat of evaporation (B.t.u./lb. mole).

Equation 4 may also be simplified for condensation as follows (6) $$\frac{\Delta P''}{P} = \frac{L_V}{RT_m^2}\Delta T'$$

Solving for Equation 1 with the total pressure increase being expressed as $\Delta P' + \delta P + \Delta P''$ as illustrated in FIG. 1, and with the compressor 25 having an assumed 100% efficiency.

(7) $$W = C_p\Delta T + RT_m Ln\left[1 + \frac{\Delta P' + \delta P + \Delta P''}{P_0}\right]$$

where:

$C_p$ = Molal heat capacity at constant pressure

Equation 7 may be simplified (8) $$W = C_p\Delta T + RT_m\frac{\Delta P' + \Delta P''}{P_0} + RT_m\frac{\delta P}{P_0}$$

(9) $$W = \left(C_p + \frac{L_V}{T_m}\right)\Delta T + RT_m\frac{\delta n}{N}$$

If $C_p\Delta T$ is small compared with the term $$\frac{L_V}{T_m}\Delta T$$

and if the compressor efficiency be represented as $\epsilon$ then Expression 9 may be solved

(10) $$W = \frac{1}{\epsilon}\left[\frac{L_V\Delta T}{T_m} + RT_m\frac{\delta n}{N}\right]$$

Equation 10 may be solved by substituting the values as used above and with $L_v = 19,230$ B.t.u./lb. mole

(11) $$W = \frac{1}{\epsilon}[38.5\ \Delta T + 36]\ \text{B.t.u./lb. mole}$$

(12) $$W = \frac{1}{\epsilon}[2.1\ \Delta T + 2]\ \text{B.t.u./lb.}$$

For the above-described system with $\Delta T$ having an assumed value of 2° F. and with a 75% efficient compressor 25 then the actual work required by Equation 12 will be approximately four times the theoretical value shown in Expression 3. This energy requirement of the present invention of four times the theoretical value is to be compared with conventional distillation systems in which the energy requirements are usually in the order of 30 to 50 times the theoretical value.

Referring again to FIG. 1, as the compressed water vapor condenses on the slurry it is effective to melt most of the wax in the slurry to result in an immiscible liquid wax comprising a very small quantity of wax as for example, 1% solid wax to 99% liquid wax. The resultant liquid wax and condensed pure water are discharged from the bottom of the condenser 34 into a line 40 through which it is conducted to an inlet of a separating tank or vessel 41. In the tank the pure water and the liquid wax gravity separate since the pure water has a substantially higher specific weight than the liquid wax. There is provided in the right hand end of the tank in its upper part a line 15 having a pump 15a inserted therein for discharging the liquid wax from the tank 41 and for recirculating the heat transfer liquid for addition to fresh batches of crude saline solution flowing in the mixing line 16. In this manner, the heat transfer material is recirculated around the distillation system and the energy used in melting the wax in the condenser is then utilized to raise the temperature of new batches of crude saline water.

As previously described, the temperature of the crude saline water flowing in the feed line 10 is increased by flow through heat exchangers 12 and 13. The heat supplied to heat exchanger 13 is provided by the condensed pure water having been separated from the liquid wax in tank 41. The pure water is discharged from the bottom of tank 41 into a line 43 through which it is conducted to a jacket of the heat exchanger 13. A pump 43a is inserted in line 43 so that the pure water is supplied under pressure to the jacket of heat exchanger 13. The pure water is discharged from the heat exchanger 13 by way of a purified water supply line 46. The heat for heat exchanger 12 is supplied by the concentrated saline water which has been heated by the heat transfer liquid and which has settled in tank 30. That concentrated saline water is discharged from the bottom of tank 30 into a line 45, having a pump 45a inserted therein, for supplying the concentrated saline water under pressure to a jacket of the heat exchanger 12. The concentrated saline water is discharged from the jacket of heat exchanger 12 into a line 44 and then suitably disposed of.

In a preferred form of the invention, cooling tubes (not shown) may be provided in the condenser 34 in order to aid in the condensation of the pure water vapor which has been conducted into the condenser. These cooling tubes may be necessary as a result of the inefficiency of compressor 25.

Now that the principles of the invention have been explained, it will be understood that many modifications may be made. For example, the distillation system may be used to concentrate a sugar solution in the commercial production of sugar. In addition, the system may be utilized to concentrate the waste liquor in the manufacture of paper from wood pulp.

What is claimed is:

1. A continuous process for the treatment of a solution for obtaining part of the solution in a concentrated state and a part thereof as pure solvent comprising the steps of, mixing an immiscible heat transfer liquid at its melting point temperature with said solution to obtain close contact between said transfer liquid and said solution, spraying said mixture into an evaporator having an internal pressure for vaporization of said solution into a vapor under isothermal conditions at slightly below the melting point temperature while partially solidifying the immiscible liquid into a slurry, passing said slurry and solution which has not been vaporized and which has become concentrated out of said evaporator into a first separation zone and there gravity separating said concentrated solution from said slurry, compressing said vapor, simultaneously pasing (1) the separated slurry through a conduit adjacent the upper portion of a condenser for discharging said separated slurry throughout said condenser and (2) said compressed vapor adjacent said upper portion, said condenser having a higher pressure than that in said evaporator so that said vapor condenses as pure solvent on said slurry and an intimate contact therewith under isothermal conditions at slightly above said melting point temperature to melt the slurry to its liquid immiscible state, passing said immiscible liquid and said pure solvent out of said condenser and into a second separation zone and there separating said immiscible liquid from said pure solvent by the difference in specific weights thereof, and recirculating the separated immiscible liquid to mix with said solvent prior to passing said solvent into said evaporator.

2. In the distillation of saline water, the continuous process which comprises, mixing an immiscible heat transfer liquid at its melting point temperature with saline water previously heated at least to a temperature slightly less than said melting point temperature to obtain close contact between said transfer liquid and said saline water, passing said mixture onto a tray in an evaporator having an internal pressure for vaporization of said saline water into a vapor under isothermal conditions at slightly below said melting point temperature while partially solidifying the immiscible liquid into a slurry, passing said slurry and saline water down said tray until sufficient water has evaporated and said transfer liquid has further solidified into the slurry, passing said slurry and saline water which has not been vaporized and which has become concentrated out of said evaporator into a first separation zone and there gravity separating said concentrated saline water from said slurry, compressing said pure water vapor, simultaneously passing (1) the separated slurry through a conduit adjacent the upper portion of a condenser for discharging the separated slurry throughout said condenser and (2) said compressed pure water vapor adjacent said upper portion, said condenser having a higher pressure than that in said evaporator so that said vapor condenses as pure water on said slurry and in intimate contact therewith under isothermal conditions at slightly above said melting point temperature to melt the slurry to its liquid immiscible state, passing said immiscible liquid and said pure water out of said condenser and into a second separation zone and there gravity separating said immiscible liquid from said pure water, and recirculating the separated immiscible liquid for mixing with said saline water prior to passage into said evaporator.

3. The process of claim 2 in which said saline water previously heated is supplied with said heat from said concentrated saline water and from said pure solvent.

4. An apparatus for the treatment of a solution for continuously obtaining part of the solution in a concentrated state and a part thereof as pure solvent comprising:

means for mixing said solution with an immiscible heat transfer liquid at its melting point temperature to obtain close contact between said transfer liquid and said solution, vaporizing means having a tray disposed therein, means for passing said mixed solution and immiscible liquid onto said tray, said vaporizing means having an internal pressure for vaporization of said solution into a vapor under isothermal conditions at slightly below said melting point temperature until sufficient solution has evaporated and said transfer liquid has partially solidified into a slurry, means for discharging from said vaporizing means to a first separation vessel said slurry and said solution which has not evaporated and which has become concentrated to provide for the gravity separation of said concentrated solution and said slurry by the difference in specific weights thereof, means for compressing said vapor, a condensing chamber having a conduit adjacent the upper portion thereof, means for passing (1) said separated slurry through said conduit for discharging said separated slurry throughout said condensing chamber and (2) said compressed vapor adjacent said upper portion of said condensing chamber, thereby condensing said vapor as a pure solvent on said slurry and in intimate contact therewith under isothermal conditions slightly above said melting point temperature to melt said slurry to its liquid immiscible state, means for discharging from said condensing chamber to a second separation vessel said pure solvent and said immiscible liquid to provide for the gravity separation of said pure solvent from said immiscible liquid by the difference in the specific weights thereof, and means for recirculating said separated immiscible liquid to said mixing means to obtain close contact between said separated immiscible liquid and said solution.

5. The apparatus of claim 4 in which said solution is saline water and in which said pure solvent is fresh water.

6. An apparatus for the treatment of saline water for continuously obtaining part of the saline water in a concentrated state and a part thereof as pure water comprising, means for mixing an immiscible heat transfer liquid at its melting point temperature with said saline water previously heated at least to a temperature slightly less than said melting point temperature to obtain close contact between said transfer liquid and said saline water, vaporizing means, means for spraying said mixed saline water and immiscible liquid into said vaporizing means having an internal pressure for vaporization of said saline water into a vapor under isothermal conditions at slightly below said melting point temperature and for partial solidification of said immiscible liquid into a slurry, means for discharging from said vaporizing means to a first separation vessel said slurry and said saline water which has not vaporized and which has become concentrated to provide for the gravity separation of said concentrated saline water and said slurry by the difference in specific weights thereof, means for compressing said vapor, a condensing chamber having a conduit adjacent the upper portion thereof, means for passing (1) said separated slurry through said conduit for discharging said separated slurry throughout said condensing chamber and (2) said compressed vapor adjacent said upper portion of said condensing chamber thereby condensing said vapor as pure water on said slurry and in intimate contact therewith under isothermal conditions slightly above said melting point temperature to melt said slurry to its liquid immiscible state, means for discharging from said condensing chamber to a second separation vessel said pure water and said immiscible liquid to provide for the gravity separation of said pure solvent from said immiscible liquid by the difference in the specific weights thereof, and means for recirculating said separated immiscible liquid to said mixing means to obtain close contact between said separated immiscible liquid and said saline water.

7. The apparatus of claim 6 in which there is provided heat exchange means connected to said mixing means for supplying heat to said saline water from said concentrated saline water and from said pure water.

References Cited

UNITED STATES PATENTS

| 2,921,004 | 1/1960 | Wood | 203—10 X |
| 2,976,224 | 3/1961 | Gilliland | 203—10 |
| 3,032,482 | 5/1962 | Shoemaker | 203—10 |
| 3,219,554 | 11/1965 | Woodward | 202—173 X |
| 3,232,847 | 2/1966 | Hoff | 202—173 X |
| 3,236,747 | 2/1966 | Margiloff | 203—100 X |
| 3,298,932 | 1/1967 | Bauer | 203—100 |

FOREIGN PATENTS 841,374   7/1960   Great Britain.

OTHER REFERENCES

Encyclopedia of Chemical Technology, vol. 14 (1955), pp. 612 and 614 (P.O. Scientific Libr.).

NORMAN YUDKOFF, *Primary Examiner.*

F. E. DRUMMOND, *Assistant Examiner.*